(12) United States Patent
McEvoy et al.

(10) Patent No.: US 10,027,544 B1
(45) Date of Patent: Jul. 17, 2018

(54) DETECTING AND MANAGING CHANGES IN NETWORKING DEVICES

(71) Applicant: Amazon Technologies, Inc., Seattle, WA (US)

(72) Inventors: Fintan McEvoy, Dublin (IE); Pablo Sebastián Carranza Giotto, Dublin (IE); Andreea Diana Lucau, Dublin (IE); Devin Kowatch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 14/918,426

(22) Filed: Oct. 20, 2015

(51) Int. Cl.
*G06F 15/177* (2006.01)
*H04L 12/24* (2006.01)

(52) U.S. Cl.
CPC ...... *H04L 41/0816* (2013.01); *H04L 41/0856* (2013.01); *H04L 41/0863* (2013.01); *H04L 41/0866* (2013.01)

(58) Field of Classification Search
CPC ............ H04L 41/0266; H04L 41/0813; H04L 41/085; H04L 41/0816; H04L 41/0863; H04L 41/0856; H04L 41/0866
See application file for complete search history.

(56) References Cited

U.S. PATENT DOCUMENTS

| | | | | |
|---|---|---|---|---|
| 8,024,618 | B1 * | 9/2011 | Margolis | G06F 11/0727 714/43 |
| 2004/0249916 | A1 * | 12/2004 | Graves | H04L 12/4675 709/223 |
| 2005/0120106 | A1 * | 6/2005 | Albertao | G06F 8/65 709/223 |
| 2006/0031427 | A1 * | 2/2006 | Jain | H04L 41/028 709/220 |
| 2006/0085526 | A1 * | 4/2006 | Gulland | G06F 15/177 709/221 |
| 2007/0150572 | A1 * | 6/2007 | Cox | H04L 41/0803 709/223 |

(Continued)

OTHER PUBLICATIONS

Wikipedia, "Ansible (software)," retrieved from https://en.wikipedia.org/wiki/Ansible_(software) on Dec. 10, 2015, 5 pages.

(Continued)

*Primary Examiner* — Mohamed A Wasel
(74) *Attorney, Agent, or Firm* — Seed IP Law Group LLP

(57) ABSTRACT

A Change Management system provides change management functionality by using configuration information that specifies various types of modifications to perform to networking devices, types of monitoring to perform for the networking devices (e.g., executable commands to use to gather information about operations of the networking devices), types of automated responses to problems identified by the monitoring (e.g., rollback commands to remove modifications that were performed), etc. for controlling and monitoring changes to the networking devices. Such configuration information may be specified by, for example, a user who is associated with one or more such networking devices, including a user who is a client of a service provider environment that provides various types of computing resources to its users.

21 Claims, 6 Drawing Sheets

(56) References Cited

U.S. PATENT DOCUMENTS

| | | | | |
|---|---|---|---|---|
| 2011/0004914 A1* | 1/2011 | Ennis, Jr. | ............ | H04L 41/0853 726/1 |
| 2011/0055899 A1* | 3/2011 | Dollar | ..................... | H04L 41/28 726/3 |
| 2011/0231532 A1* | 9/2011 | Nishimura | .......... | H04L 41/0672 709/221 |
| 2012/0072587 A1* | 3/2012 | Nishiyama | .......... | H04L 41/0266 709/224 |
| 2014/0228014 A1* | 8/2014 | Tervo | ................ | G06Q 20/3223 455/419 |
| 2017/0078144 A1* | 3/2017 | Purusothaman | .... | H04L 41/0813 |

OTHER PUBLICATIONS

Wikipedia, "Observium," retrieved from https://en.wikipedia.org/wiki/Observium on Dec. 10, 2015, 3 pages.

Wikipedia, "OpenNMS," retrieved from https://en.wikipedia.org/wiki/OpenNMS on Dec. 10, 2015, 5 pages.

Wikipedia, "RANCID (software)," retrieved from https://en.wikipedia.org/wiki/RANCID_(software) on Dec. 10, 2015, 2 pages.

* cited by examiner

US 10,027,544 B1

DETECTING AND MANAGING CHANGES IN NETWORKING DEVICES

BACKGROUND

Many companies and other organizations operate computer networks that interconnect numerous computing systems to support their operations, with the computing systems being alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities such as businesses to provide computing resources to customers. However, as the scale and scope of computer networks has increased, the task of provisioning, administering, and managing the associated physical computing resources has become increasingly complicated.

Thus, various problems exist with the implementation and use of such computer networks, including with administering and managing associated physical computing resources.

DETAILED DESCRIPTION

Figure 1:
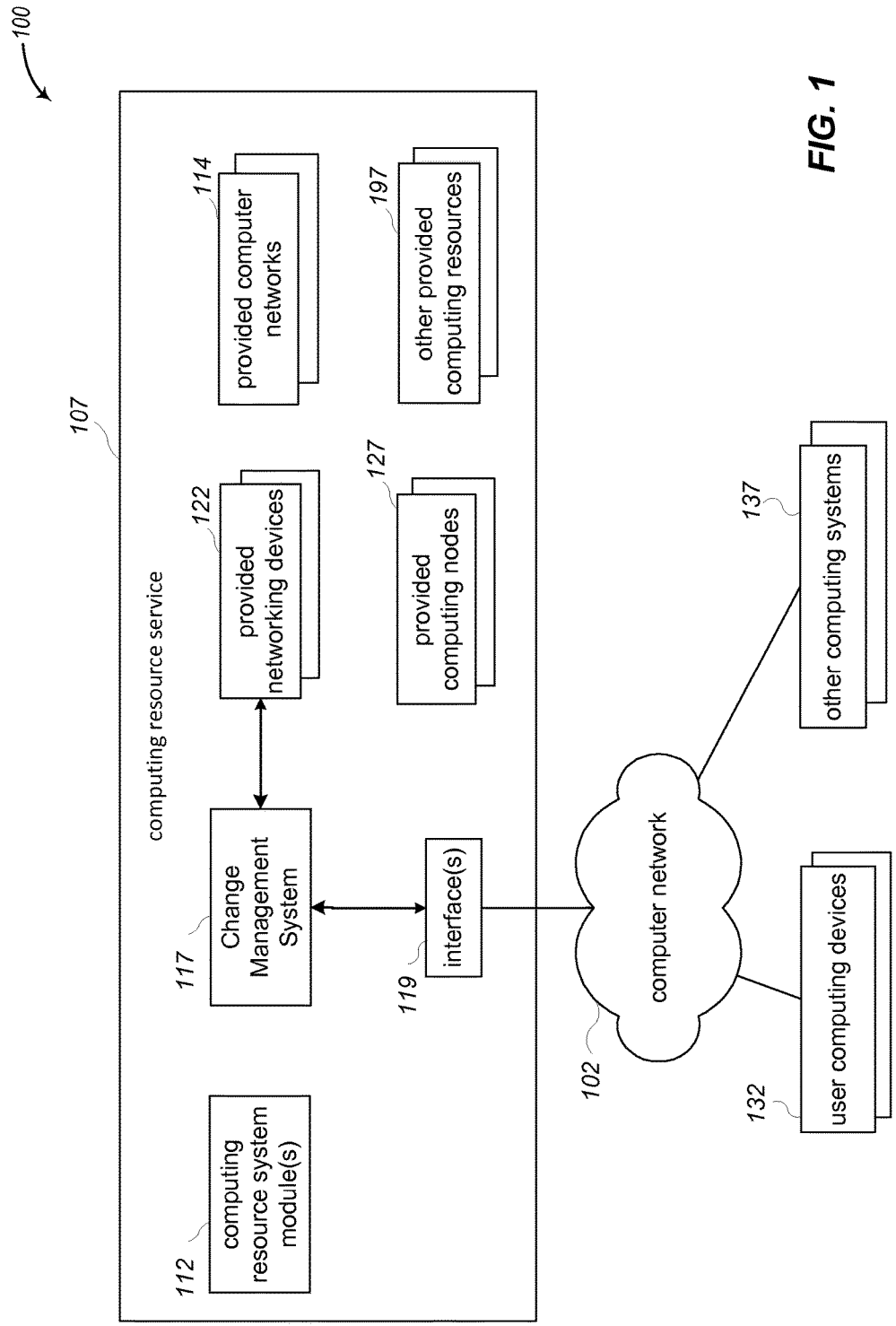
FIG. 1 is a network diagram illustrating an example environment in which techniques may be used for performing change management operations for networking devices.

Techniques are described for providing change management functionality for networking devices, such as in a service provider environment that provides networking devices and computing nodes and other computing-related resources to customers and/or to other internal users. In at least some embodiments, a Change Management system is provided for use by such users (e.g., by the service provider), such as to provide an interface that enables the users to define various configuration information that the Change Management system then implements as part of providing change management functionality for networking devices associated with those users. The configuration information may specify, for example, various types of modifications to perform to networking devices, types of monitoring to perform for the networking devices (e.g., executable commands to use to gather information about operations of the networking devices), types of automated responses to problems identified by the monitoring (e.g., rollback commands to remove modifications that were performed), etc. for controlling and monitoring changes to the networking devices.

As one example, the Change Management system may be configured to perform a first command on a networking device to collect information of current networking operations of the networking device prior to performing a modification to the networking device. At a time after the performance of the first command—such as after one or more modifications are made to the settings or other configuration of the networking device—the Change Management system performs a second command on the networking device to collect additional corresponding information from the networking device. The information obtained in response to the first command is compared to the information obtained in response to the second command, allowing changes in the networking operations of the networking device to be determined. The Change Management system may then further determine if a problem is identified in operations of the networking device based on the determined changes in the networking operations information. If there is a problem with the networking device, the modifications to the networking device may be automatically removed, such as by performing a roll back instruction to remove the modifications to the networking device.

The Change Management system may in at least some embodiments further determine a type, such as a model and version, of networking device to be checked and modified. Various different types of configuration information may be determined based on the type of the networking device. In this way, customized configuration information may be utilized for different networking devices. Accordingly, the Change Management system may perform operations to collect and compare information for multiple networking devices in some embodiments, such as in parallel or otherwise in a related manner, as well as to optionally modify operations of some or all such networking devices—such multiple networking devices may be of one or more multiple different types, may be co-located or otherwise associated together (e.g., all networking devices controlled by or otherwise associated with a user, some or all networking devices in a subnet or other specified portion of the topology of a computer network, etc.), may include the same or different types of commands or other operations (e.g., different commands for different types of networking devices), etc. Comparison of collected information from multiple networking devices can be used, for example, to identify problems in networking devices in a same subnet, networking devices that are not operating in a same or similar manner as other networking devices, etc. In other embodiments, the Change Management system may perform one or periodic snapshot commands to determine initial or baseline networking operations information of a networking device. This information may be compared to that from a pre-modification collection to determine if the networking device is in a state to perform the modification. Similarly, one or more post-modification information collections may be performed to determine if the modification introduced errors or problems into the networking operations of the networking device, in which case the modification may be rolled back or other actions may be performed, such as a further modification, another collection operation, or the like.

In at least some of the embodiments described below, the described techniques may be used with networking devices provided by one or more service provider environments, although the described techniques may be used with other types of networking environments in other embodiments, including by a company or other organization on behalf of internal members or other users using devices provided by the company/organization, by an entity that manages changes to devices provided or controlled by other entities, etc. In addition, while various specific types of networking devices, monitoring activities, operational modification activities, and automated response activities are discussed for the purpose of illustration, it will be appreciated that the described techniques may be used with other types of devices, monitoring activities, operational modification activities, and/or automated response activities—as one example, while commands to collect information are discussed in some embodiments as being performed on networking devices, other types of monitoring activities may be used in other embodiments to obtain information about operations of devices being monitored. Embodiments discussed below are provided for illustrative purposes and are simplified for the sake of brevity, and the inventive techniques may be used in a wide variety of other situations, some of which are discussed below.

FIG. 1 is a network diagram illustrating an example of a computing resource service that provides user-configurable computing resources to users, such as managed computing nodes, virtual computer networks, etc. After such computing resources are configured and provided by the computing resource service for a user of the computing resource service, the user may interact from one or more remote locations with the provided computing resources, such as to execute programs on the computing nodes, to dynamically modify the provided virtual computer network(s) and/or the provided computing node(s) while they are in use, etc. The described techniques for providing users with access to perform commands on network-accessible computing resources and associated functionality may be used in some embodiments with such a computing resource service, as discussed in greater detail elsewhere herein, including with respect to the examples of FIG. 2 and the flowcharts illustrated and described in conjunction with FIGS. 5A-5B.

In particular, example system 100 of FIG. 1 includes a computing resource service 107 implemented using one or more configured computing systems (not shown) to provide functionality over one or more computer networks 102 (e.g., over the Internet) to users (not shown) using user computing devices 132. The computing resource service 107 may, for example, be part of an environment provided by a service provider entity, such as a network service available over the Internet or other network. The computing resource service 107 enables the users to access and use computing nodes 127, computer networks 114 and/or other computing resources 197 provided to the user by the computing resource service 107, although in other embodiments and situations a particular computing resource service may provide a subset of such types of computing-related resources (e.g., only one of computing nodes, virtual computer networks, and other computing resources). For example, a number of users interact over the computer network 102 with computing resource system module(s) 112 of the computing resource service 107 to create and configure various provided computing nodes 127 and/or computer networks 114 being provided by the computing resource service 107. In this example embodiment, the computing resource system module(s) 112 assist in providing functionality of the computing resource service 107 to the remote users, such as modifying which computing-related resources 127, 114, and 197 are in use for the requesting user, such as by terminating or stopping use of particular computing-related resources that were previously allocated to and provided for the user, and/or by adding or otherwise initiating use of additional provided computing-related resources 127, 114, and 197 for the user; etc. In some embodiments and situations, some commands or other related requests intended for the provided computing-related resources 127, 114, and 197 may be sent directly to those provided computing-related resources without being controlled by the computing resource system module 112.

In addition, the computing resource service 107 includes various networking devices 122 that facilitate the use of the computer networks 114 and other resources provided by the computing resource service 107 by the remote users. The computing resource service 107 includes one or more interfaces 119 to enable the remote users to access and manage a Change Management System 117 to perform some or all of the described techniques to execute and monitor change management operations on the networking devices 122. The computing resource service 107 also includes one or more other interfaces (not shown) to provide functionality of the computing resource service 107 to the remote users, such as to provide access control of users to the provided computing nodes 127, provided virtual computer networks 112, and/or other provided computing resources 197 (e.g., databases, storage volumes, or other storage structures). These interfaces may utilize one or more APIs (application programming interfaces) that enable remote computing systems to programmatically interact with the Change Management system 117 and/or to access some or all functionality of computing resource service 107 on behalf of users (e.g., to perform change management operations on networking devices 122; to create, configure, and/or initiate use of provided computing nodes 127 and/or managed computer networks 114; etc.). In addition, in at least some embodiments, the interface(s) may include one or more GUIs (graphical user interfaces) via which users manually interact with the computing resource service 107 to perform some or all such actions.

In the illustrated embodiment, when users of computing devices 132 use the interface(s) 119 to send commands or related requests (e.g., change management instructions) intended for the networking devices 122, at least some such commands or related requests are directed to the Change Management system 117 to determine whether and how to perform such commands or related requests, with the Change Management system 117 then performing subsequent interactions with the networking devices 122 on behalf of the user as appropriate. As described in greater detail elsewhere herein, such interactions may include, for example, one or more of the following: performing one or more operations to collect of information of one or more of the networking devices 122 (e.g., performing a collection operation before and after a modification to the networking device 122, and optionally performing a snapshot that is compared to information from a pre-modification collection to determine whether or not to perform the modification), collecting information that describes networking operations associated with the networking device 122, comparing the information and executing an action based on results of the compare (e.g., rolling back the modification to the networking device 122; executing another operation to collect and compare information; initiating a further modification to the networking device 122; etc.), etc.

The computer network 102 may be, for example, a publicly accessible network of linked networks, possibly operated by distinct parties, such as the Internet. Similarly, the computing resource service 107 may include one or more internal networks (not shown) for connecting computing systems of the computing resource service 107 to each other, such as internal networks that are separate and distinct from the computer network 102.

Each of the provided computer networks 114 may be virtual or physical networks and may be configured in various ways by the users for whom they are provided. In some situations, at least some such virtual computer networks may be created and configured as network extensions to existing remote private computer networks of users, although in the illustrated embodiment the provided computer networks 114 are not shown to be connected to such other existing or virtual computer networks. In addition, at least some such computer networks may each be a private computer network that is accessible only by the user that creates it, although in other embodiments at least some computer networks provided by the computing resource service 107 for users may be publicly accessible. For example, each of the provided computer networks 114 includes multiple computing nodes (not shown), at least some of which are from the plurality of computing nodes 127 provided by or otherwise under the control of the computing resource service 107, while in other embodiments at least some other computing systems 137 may be used to provide some or all computing nodes for one or more of the provided computer networks 114—such other computing systems 137 may, for example, be provided by or under control of the user for whom a computer network 114 that uses those other computing systems 137 is provided, or may be computing systems that are provided by third parties (e.g., for a fee). For example, in at least some embodiments, each provided computer network 114 may include a customer-configured quantity of multiple such computing nodes that are dedicated for use as part of that provided computer network. In particular, a user may interact with the computing resource system module 112 to configure a quantity of computing nodes to initially be included in a computer network provided for the user (e.g., via one or more programmatic interactions with an API provided by the computing resource service 107), and may further configure a network topology of the provided computer network (e.g., one or more logical subnets that each includes one or more of the provided computing nodes 127, the networking devices 122, endpoints for VPN (virtual private network) connections or connections to other external entities, etc.).

In addition, the computing resource service 107 may provide multiple different types of computing nodes in at least some embodiments, such as, for example, computing nodes with various performance characteristics (e.g., processor speed, memory available, storage available, etc.) or other capabilities. If so, in at least some such embodiments, a user may specify the types of computing nodes to be included in a provided computer network for the customer. In addition, in at least some embodiments, the computing nodes may be physical computing systems or may be virtual machines that are each hosted on one or more physical computing systems or physical computing machines, and the communications that are handled for managed virtual computer networks may include transmissions of data (e.g., messages, packets, frames, streams, etc.) in various formats. Furthermore, in at least some situations, an embodiment of the computing resource service may be part of or otherwise affiliated with a program execution service (or "PES") that executes multiple programs on behalf of multiple users of the service, such as a program execution service that uses multiple computing systems on multiple physical networks (e.g., multiple physical computing systems and networks within one or more data centers), optionally in multiple geographical locations. Thus, computing-related resources 127, 197, and/or 114 may be provided for users in various manners in various embodiments, and may be configured to have various types of functionality in various embodiments.

Figure 2:
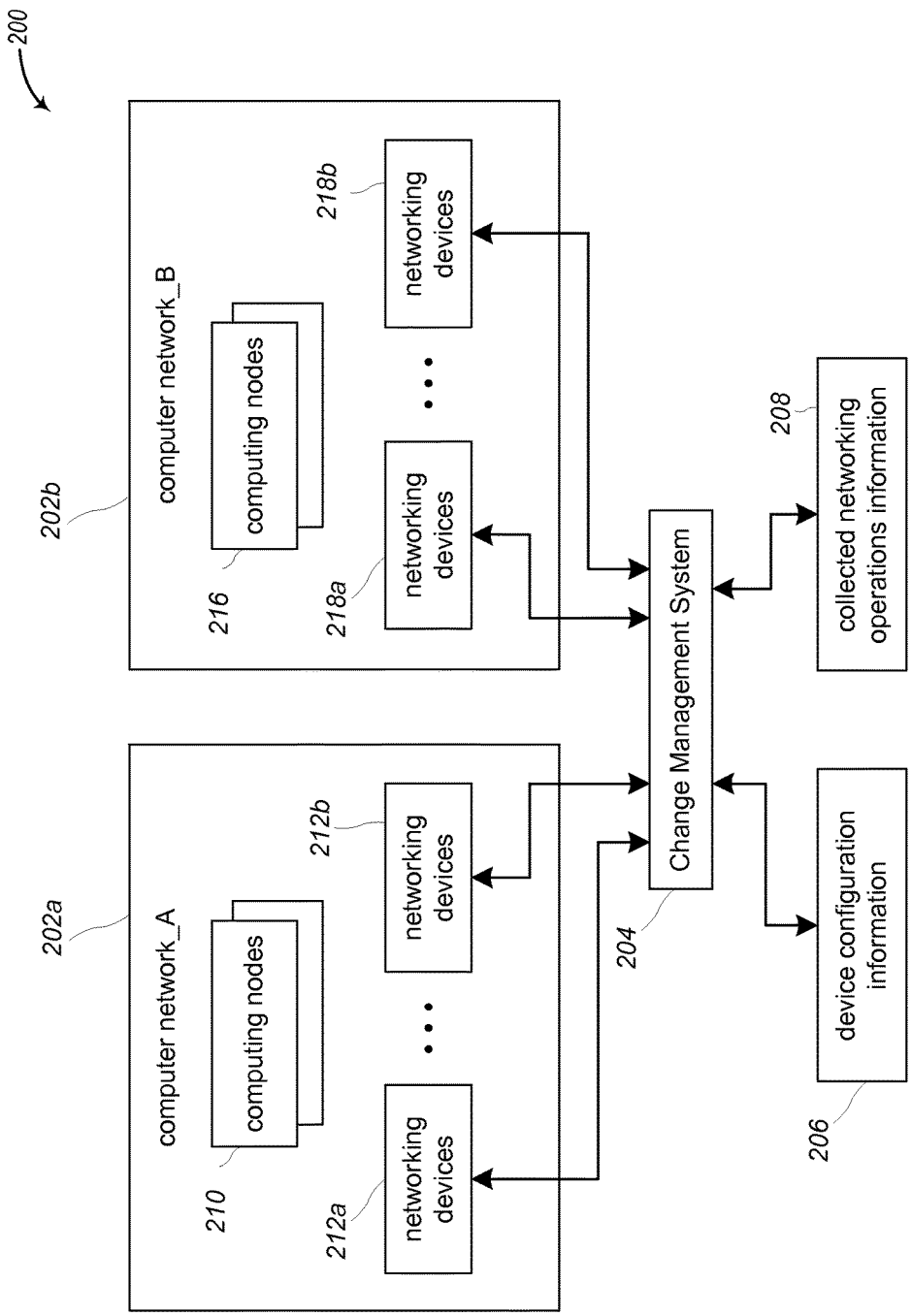
FIG. 2 illustrates an example system for performing change management operations on various networking devices.

FIG. 2 illustrates an example system 200 for performing change management operations on various networking devices. The system 200 includes a Change Management system 204 (e.g., Change Management system 117 of FIG. 1), device configuration information 206, collected networking operations information 208, and computer networks 202a-202b (e.g., computer networks 114 of FIG. 1).

The computer networks 202a-202b may be provided for one or more customers of a computing resource service (e.g., computing resource service 107 of FIG. 1). The computer networks 202a-202b may include a variety of different physical, logical, or virtual networks that are provided to a user. Each of the computer networks 202a-202b includes one or more computing nodes (e.g., provided computing nodes 127 of FIG. 1) and one or more networking devices (e.g., networking devices 122 of FIG. 1). For example, computer network 202a includes computing nodes 210, and networking devices 212a-212b and computer network 202b includes computing nodes 216 and networking devices 218a-218b. Each of the computing nodes 210 and 216 may be hosted by one or more computing machines (not shown) that perform various actions associated with managing the computing nodes. The networking devices 212a-212b and 218a-218b provide various networking operations and functionality associated with their corresponding computer network. Examples of the networking devices 212a-212b and 218a-218b may include, but are not limited to, routers, switches, bridges, gateways, hubs, firewalls, load balancers, etc. Such a networking device may, for example, be a physical device provided by the computing resource service for facilitating the use of the computer networks 202a-202b for users accessing the computing nodes 210 and 216, and/or may be a virtual device (e.g., implemented using one or more computer systems configured to emulate functionality of the networking device, such as multiple computer systems that emulate the functionality of the virtual device in a distributed manner).

The Change Management system 204 performs various change management operations on one or more of the networking devices. The Change Management system 204 determines configuration information for each networking device for which it performs change management. The configuration information describes the operations associated with the change management for one or more of the networking devices 212a-212b and 218a-218b. For example, the configuration information may indicate various commands (e.g., operations to collect information or take a snapshot of networking operations information, modification commands, rollback commands, or other commands) for the Change Management system 204 to perform with a networking device. In some embodiments, the commands may include various instructions that the collect and command system 204 provides to the networking device for execution by the networking device (and the networking device or the Change Management system 204 monitors networking operations in response to the execution of the instructions), various requests that the Change Management system 204 sends to the networking device requesting networking operations information (where the networking device responds to the Change Management system 204 with networking operations information associated with the request), etc. After the Change Management system 204 obtains information (e.g., various networking operations information) from the networking device (e.g., in response to multiple operations to collect information for of a networking device), the Change Management system 204 compares the obtained information to determine changes in the obtained information and/or changes in the networking operations of the networking device. The Change Management system 204 determines if there is a problem with networking device based on the changes, such as if the changes exceed a threshold (e.g., the obtained information may be hashed or normalized to numeric values such that a difference between two numeric values can be compared against a threshold value to determine if there is a problem, such as the difference exceeding the threshold value). Depending on the result of the compare, the Change Management system 204 can automatically perform other actions. For example, if there is a problem, then the Change Management system 204 can send another command (e.g., a rollback command or another modification command) to the networking device to remove a previous modification or make another modification in an attempt to remedy the problem.

In some embodiments, the Change Management system can determine a type (e.g., a model and version of the networking device) of the networking device 212a-212b and 218a-218b, which is used to determine the configuration and types of operations to collect information, compare information, execute modifications, perform additional actions, or the like associated with that type of device. In this way, the Change Management system 204 can customize change management functionality as described herein per networking device and perform such customized functionality in parallel on multiple different networking devices. For example, the Change Management system 204 can determine a type of each of networking devices 212a and 218b. For this example, assume networking device 212a is Type_A and networking device 218b is Type_C. Each type of networking device may have its own corresponding configuration information that defines the change management functionality for networking devices of that type. The Change Management system 204 can send the appropriate commands to networking device 212a based on it being Type_A in parallel with sending appropriate commands to networking device 218b based on it being Type_C.

Figure 3:
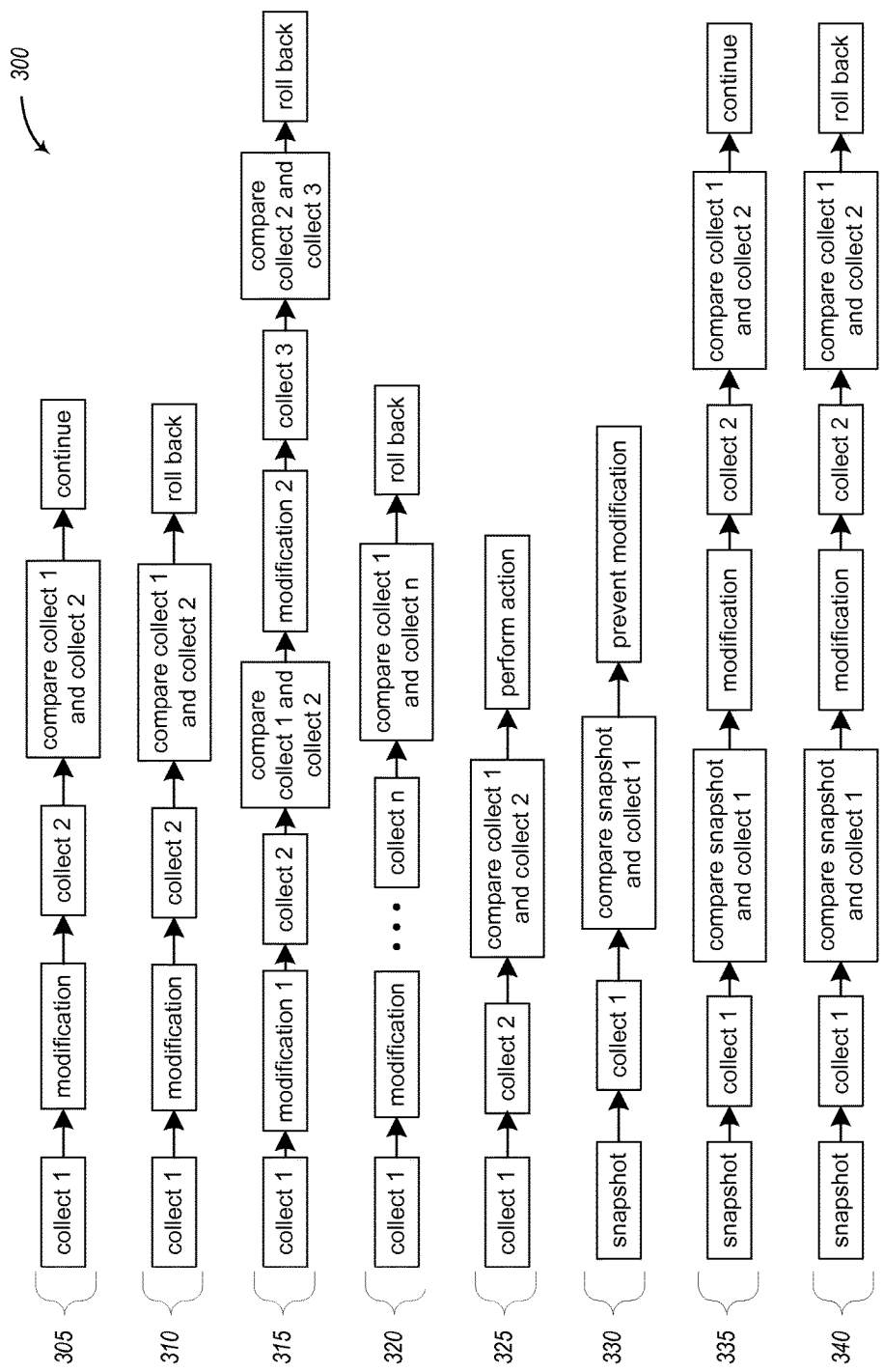
FIG. 3 illustrates examples of performing various types of change management operations on networking devices.

FIG. 3 illustrates examples of various different change management operations on networking devices, such as networking devices 122 of FIG. 1. Additional details for performing operations to collect information of networking operations of networking devices and comparing response information is described elsewhere herein. The following are brief examples of the types of operations and configuration information that may be performed on a networking device. It should be noted that in response to the execution of a command or other operation (e.g., a read command, get command, other instruction to perform an action or obtain information about networking operations of a networking device, etc.) or a snapshot, various information that describes networking operations of the networking device is monitored and/or collected. The networking operations may include, for example, a number of neighboring devices to the networking device, a state of its neighbors, paths from a routing table, interface errors, etc. In some embodiments, the networking device may execute a command to that returns structured data (e.g., objects, dictionaries, rules, table values, hashed data, etc.) that is currently stored or obtained by the networking device, where the structured data includes information about the networking operations. In other embodiments, the networking device may execute a command to cause an action that can be monitored by the networking device or some other device to collect the networking operations of the networking device. The response information is stored for later comparison with response information collected from other operations. In this way, the networking device can perform other actions, and does not have to sit idle, until additional information is collected, which allows for persistence between collection operations.

Example 305—perform a first collection operation by executing a first command on the networking device prior to performing a modification to the networking device and collecting response information. Next, perform the modification (which may be selected by a user or automatically by the system, such as periodic or scheduled updates or maintenance). Upon completion of the modification, perform a second collection operation by executing a second command on the networking device and collecting response information. The response information from the first collection operation is then compared to the response information from the second collection operation to determine changes in the networking operations of the networking device. If the changes are within a predefined threshold, then no problem is identified with the modified networking device and the operation of the modified networking device continues.

Example 310—similar to example 305, a first collection operation is performed by executing a first command on the networking device prior to performing a modification to the networking device and collecting response information. A modification to the networking device is performed. Upon completion of the modification, a second collection operation is performed by executing a second command on the networking device and collecting response information. The response information from the first collection operation is then compared to the response information from the second collection operation to determine changes in the networking operations of the networking device. If the changes exceed the predefined threshold, then a problem is identified with the modified networking device and a rollback instruction is executed to remove the modification from the networking device.

Example 315—similar to example 310, a first collection operation is performed by executing a first command on the networking device prior to performing a modification to the networking device and collecting response information. A modification to the networking device is performed. Upon completion of the modification, a second collection operation is performed by executing a second command on the networking device and collecting response information. The response information from the first collection operation is then compared to the response information from the second collection operation to determine changes in the networking operations of the networking device. If the changes are within a predefined threshold, then another modification is performed on the networking device. After the second modification, a third collection operation is performed by executing a third command on the networking device and collecting response information. This response information is then compared to the response information from the second collection operation to determine changes in the networking operations of the networking device due to the second modification. If these additional changes exceed the predefined threshold, then a problem is identified with the modified networking device and a rollback instruction is executed to remove the second modification from the networking device.

Example 320—similar to example 310, a first collection operation is performed by executing a first command on the networking device prior to performing a modification to the networking device and collecting response information. A modification to the networking device is performed. Upon completion of the modification, a second collection operation is performed by executing a second command on the networking device and collecting response information. The response information from the first collection operation is then compared to the response information from the second collection operation to determine changes in the networking operations of the networking device. If the changes are within a predefined threshold, then the operation of the modified networking device continues and another command is executed at a later time and additional response information collected. This additional response information is compared to the response information from the first collection operation. Additional collection operations and compares of information are performed until the changes exceed the predefined threshold and a problem is identified (then the rollback instruction is executed to remove the modification from the networking device) or for a predetermined amount of time or predetermined number of post-modification collection operations (then the operation of the modified networking device continue).

Example 325—a first collection operation is performed by executing a first command on the networking device and collecting response information. At some time after the execution of the first command, a second collection operation is performed by executing a second command on the networking device and collecting response information. The response information from the first collection operation is then compared to the response information from the second collection operation to determine changes in the networking operations of the networking device. If the changes exceed the predefined threshold, then one or more actions is performed (e.g., sending a notification to a system administrator of a potential problem with the networking device, performing a modification to the networking device to correct a problem, schedule another operation to collect information and compare the collected information to determine if the problem is an ongoing problem rather than an anomaly, etc.).

Example 330—a snapshot is performed on the networking device to get initial or baseline networking operation information of the networking device. The snapshot can be performed at a predetermined time or regularly scheduled intervals. Prior to a modification being performed on the networking device, a first collection operation is performed by executing a first command on the networking device and collecting response information. The networking operation information from the snapshot is then compared to the response information from the first collection operation to determine changes in the networking operations of the networking device. If the changes exceed a predefined threshold, then the modification to the networking device is not performed.

Example 335—similar to example 330, a snapshot is performed on the networking device. Prior to a modification being performed on the networking device, a first collection operation is performed by executing a first command on the networking device and collecting response information. The networking operation information from the snapshot is then compared to the response information from the first collection operation to determine changes in the networking operations of the networking device. If the changes do not exceed the predefined threshold, then the modification to the networking device is performed. Upon completion of the modification, a second collection operation is performed by executing a second command on the networking device and collecting response information. If the changes are within a predefined threshold, then the operation of the modified networking device continues.

Example 340—similar to example 335, a snapshot is performed on the networking device. Prior to a modification being performed on the networking device, a first collection operation is performed by executing a first command on the networking device and collecting response information. The networking operation information from the snapshot is then compared to the response information from the first collection operation to determine changes in the networking operations of the networking device. If the changes do not exceed the predefined threshold, then the modification to the networking device is performed. Upon completion of the modification, a second collection operation is performed by executing a second command on the networking device and collecting response information. If the changes exceed the predefined threshold, then a problem is identified with the modified networking device and a rollback instruction is executed to remove the modification from the networking device.

It should be noted that these examples are for illustrative purposes and are not to be construed as exhausting or limiting. Rather, additional combinations and number of collection operations, compares of collected information, snapshots, modifications, actions, rollbacks, etc. may be performed.

Figure 4:
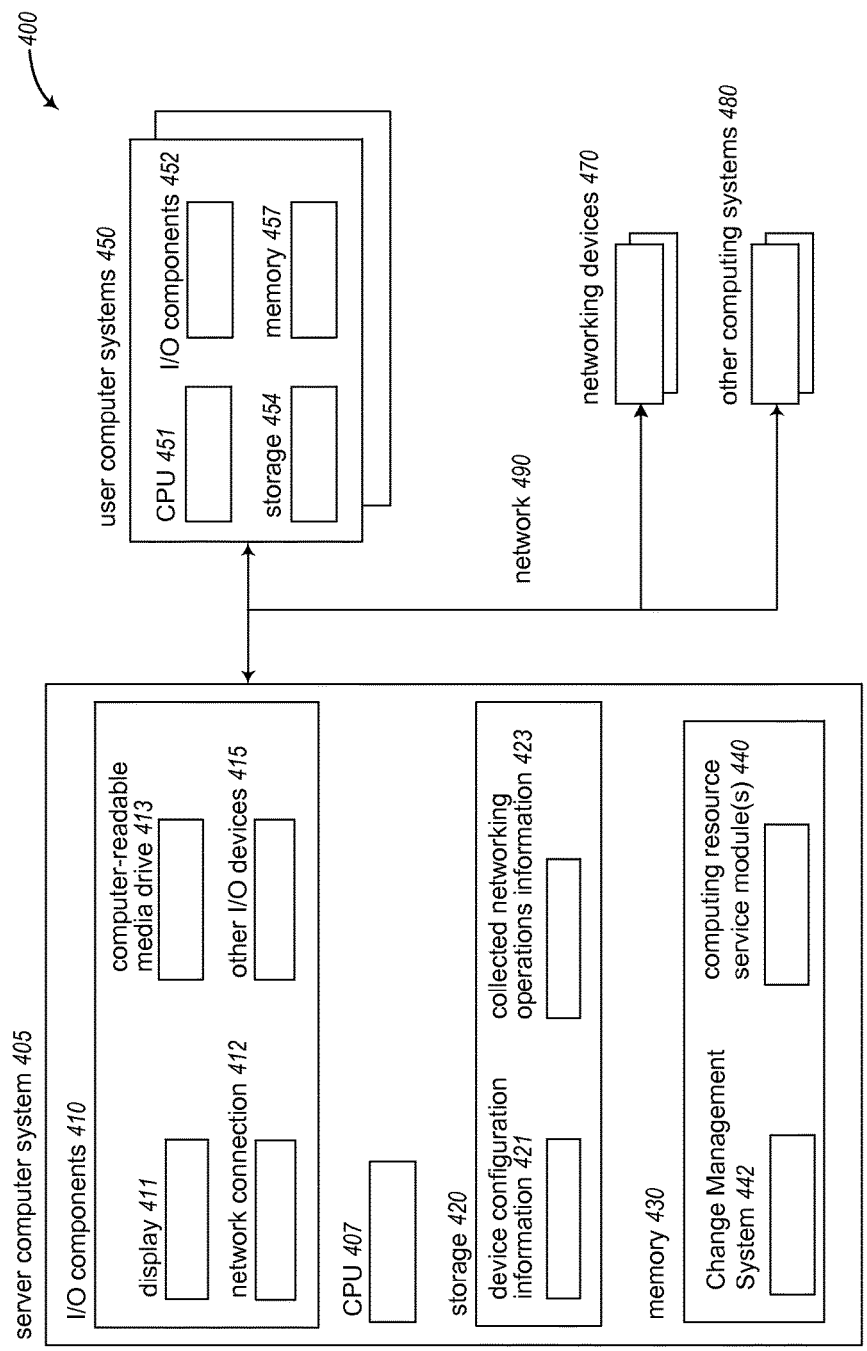
FIG. 4 is a block diagram illustrating example computing systems suitable for executing an embodiment of a system for performing change management for networking devices.

FIG. 4 is a block diagram illustrating example computing systems suitable for executing an embodiment of a system for performing change management on a networking device. In particular, FIG. 4 illustrates example system 400, which includes a server computer system 405, user computer systems 450, networking devices 470, and other computing systems 480.

The server computing system 405 is suitable for performing automated operations to provide at least some of the described techniques, including to operate a Change Management system 442 and computing resource system module(s) 440 that provide an embodiment of a computing resource service, with which at least part of the described techniques can be used, although in other embodiments the described techniques may be used in other environments that do not include the computing resource service, or the computing resource service may be provided by different server computing systems than those that provide the Change Management system.

In the illustrated embodiment, the server computing system 405 has components that include one or more hardware CPU ("central processing unit") computer processors 407, various I/O ("input/output") components 410, storage 420, and memory 430. The illustrated I/O components include a display 411, a network connection 412, a computer-readable media drive 413, and other I/O devices 415 (e.g., a keyboard, a mouse, speakers, etc.). In addition, the user computer systems 450 may each have components similar to those of the server computing system 405, including one or more CPUs 451, I/O components 452, storage 454, and memory 457, although some details are not illustrated for the computing systems 450 for the sake of brevity. The other computing systems 480 may also each include components that are similar to some or all of the components illustrated with respect to the server computing system 405, including to divide provided hardware resources among multiple hosted virtual machines, but such components are not illustrated in this example for the sake of brevity.

One or more modules of the Change Management system 442 (e.g., Change Management system 117 of FIG. 1) are stored in memory 430 to control user access to performing commands on networking devices 470 described herein, and in some embodiments each includes various software instructions that, when executed, program one or more of the CPU processors 407 to provide the described functionality.

One or more computing resource system modules 440 (e.g., computing resource system modules 112 of FIG. 1) are stored in memory 430 to provide an embodiment of the computing resource service, and in some embodiments each includes various software instructions that, when executed, program one or more of the CPU processors 407 to provide the described functionality. The module(s) of the computing resource system module 440 interact with the user computing systems 450, and the other computing systems 480 over the network 490 (e.g., via local or private networks within the computing resource service, the Internet or World Wide Web, via a private cellular network, etc.).

Various information related to the functionality of the Change Management system 440 may be stored in storage 420 and used during operation, such as the following: device configuration information 421 related to monitoring changes to one or more network devices that is performing networking operations (e.g., separate configuration information may be stored for each different type of networking device of a plurality of different types of networking devices) and collected networking operations information 423 related to networking operations information that is collected in response to a snapshot or command being executed on a networking device 470. The storage 420 may also store various other information, such as the following: user data related to particular users (e.g., their account information, specified configuration information for their provided computing resources, etc.); user virtual networks data related to particular virtual computer networks being provided to users (e.g., particular computing resources used by the virtual computer networks, such as with respect to the provided computing nodes; specified network topologies and other specified configuration information for the virtual computer networks; etc.); computing resources data related to particular computing resources (e.g., information about other computing resources being provided to users, information about additional computing resources that are available to be used as such provided computing resources, etc., such as with respect to the provided computing nodes); etc.

The other computing systems 480 may be computing systems that are used by the computing resource service to provide virtual computer networks and other computing resources, such as in one or more data centers, not shown, or to provide other functionality or services of one or more computing resource services separate from the computing resource service module 440.

The user computing systems 450 and other computing systems 480 may be executing various software as part of interactions with the computing resource system module(s) 440. For example, user computer systems 450 may each be executing software in memory 457 to interact with computing resource system module(s) 440 and/or Change Management system 442, such as a Web browser 458, including to provide configuration information for performing collection operations, modifications, compares, and rollback commands on the networking devices 470, and to interact with or otherwise use the computing resources provided by the computing resource service.

It should be appreciated that computing systems 405, 450, 470 and 480 are merely illustrative and are not intended to limit the scope of the present disclosure. The computing systems may instead each include multiple interacting computing systems or devices, and the computing systems may be connected to other devices that are not illustrated, including through one or more networks such as the Internet, via the Web, or via private networks (e.g., mobile communication networks, etc.). More generally, a computing system or other computing node may comprise any combination of hardware or software that may interact and perform the described types of functionality, including, without limitation, desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the computing resource system module(s) 440 and/or the Change Management system 442 may in some embodiments be distributed in one or more modules, as described elsewhere herein.

It should also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the computing resource system module(s) 440 and/or the Change Management system 442) or data structures, such as by execution of software instructions of the one or more software programs and/or by storage of such software instructions and/or data structures. Furthermore, in some embodiments, some or all of the systems or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, at least some embodiments of the present disclosure may be practiced with other computer system configurations.

Figure 5A:
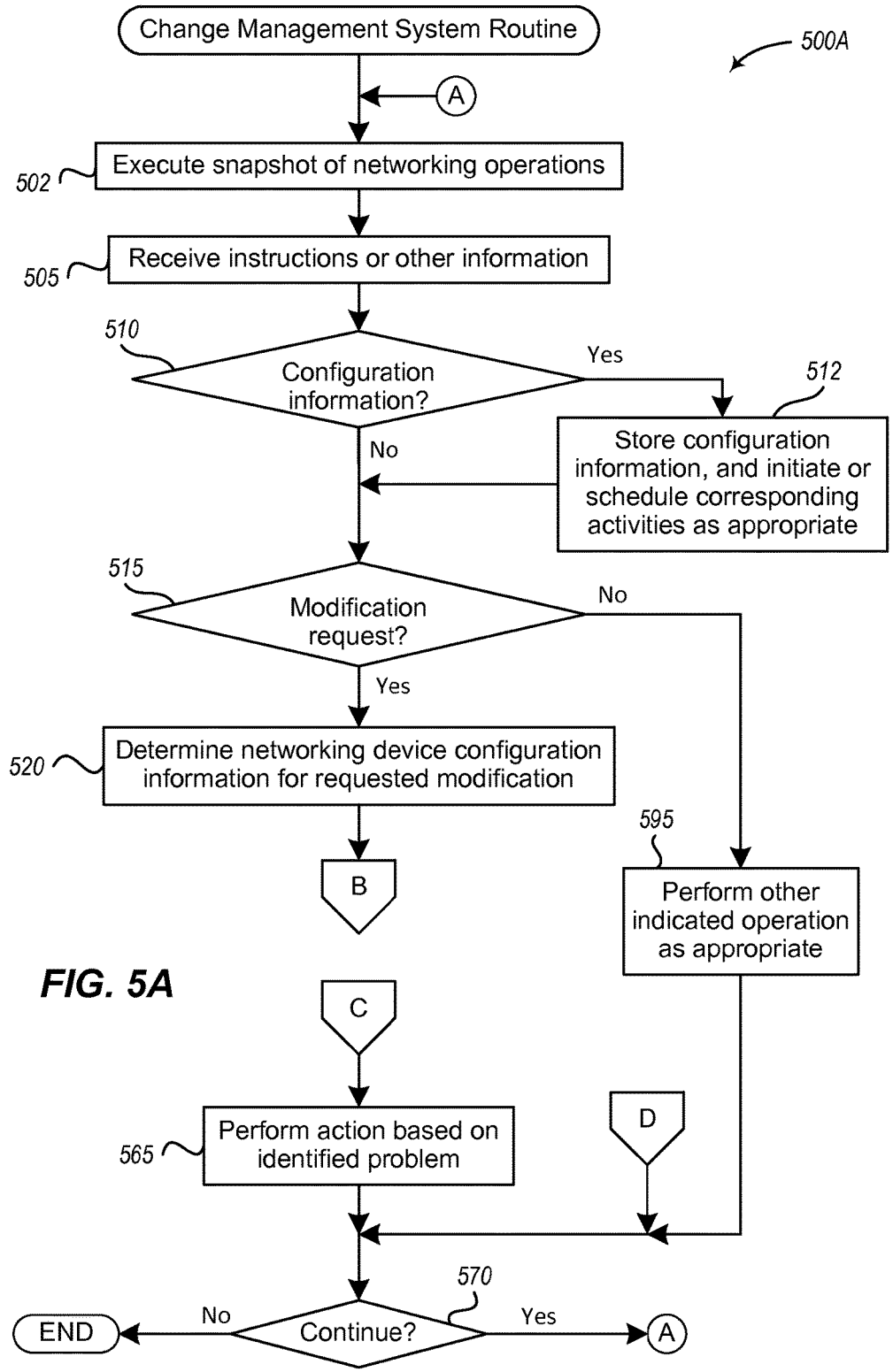
FIG. 5A-5B illustrate a flow diagram of an example embodiment of a Change Management System routine.
Figure 5B:
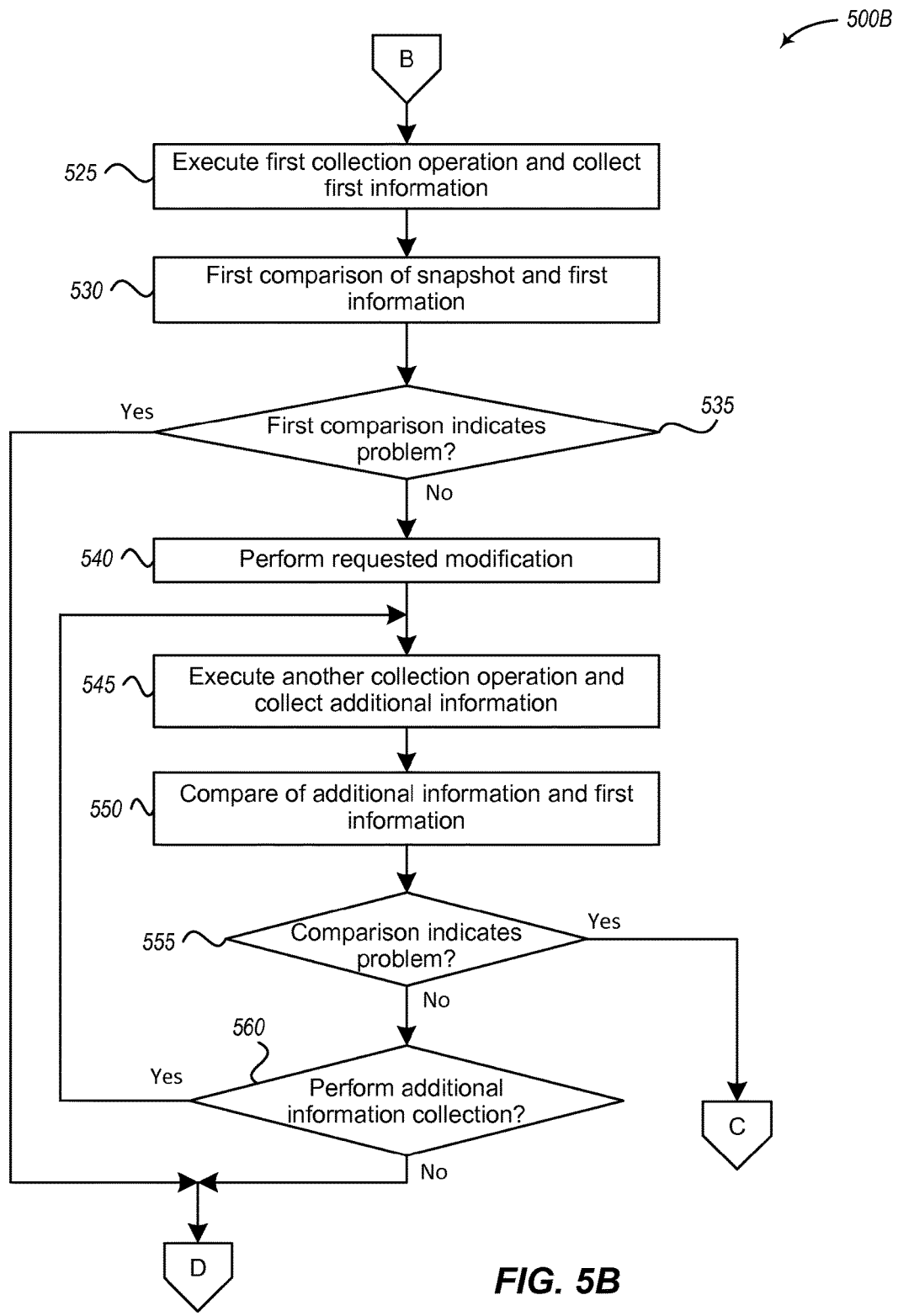

FIGS. 5A-5B illustrate a flow diagram of an example embodiment of a Change Management System routine 500A-500B. The routine 500A-500B may be provided by, for example, execution of the Change Management system 442 of FIG. 4, the Change Management system (s) 117 of FIG. 1, or otherwise by a computing resource service as discussed herein, such as to perform the described techniques for providing user-configurable managed computing nodes or other computing-related resources to users and for configuring user access to perform commands on such computing-related resources (e.g., one or more of the managed computing nodes, etc.). While the described techniques for providing users with access to perform commands on network-accessible computing resources and associated functionality are discussed in this example as being at least supported by a computing resource service, it will be appreciated that such functionality may be provided by a distinct system from the computing resource service in other embodiments.

In the illustrated embodiment of FIG. 5A, the routine 500A begins in block 502, to execute a snapshot command on the one or more networking device. The snapshot command can be executed once, at a predetermined schedule (e.g., next Thursday at 7:00 am), at periodic intervals (e.g., once every day, once a week, etc.), in response to another instruction or action from the user (e.g., a user indicates a possible problem with a networking device), in response to a predetermined state of the networking device or its networking operations (e.g., the networking device is idle for a given amount of time), etc. In at least one of various embodiments, execution of the snapshot may be optional and may not be performed. After block 502, the routine continues to block 505, where instructions or other information are received. In some embodiments, the instructions or other information may be from a user, a service owner (e.g., a manager, administrator, etc. of the computing resource service 107 of FIG. 1), etc. In at least one embodiment, the instruction may be to perform a snapshot on the one or more networking devices to determine initial, baseline, or periodic networking operations of the networking device.

After block 505, the routine 500A continues to block 510 to determine if configuration information is received from a user, such as to use in performing corresponding change management functionality for one or more networking devices associated with the user at a current and/or future time. If so, the routine continues to block 512 to store the received configuration information, as well as to initiate and/or schedule corresponding activities. For example, if the configuration information includes instructions to modify the configuration of one or more networking devices in one or more specified manners at the current time, the actions in block 512 may include initiating a corresponding modification request, as discussed further with respect to blocks 515-565. Conversely, if the configuration information specifies to schedule the modification of one or more networking devices and/or the monitoring of one or more networking devices at one or more later times, the routine may later initiate corresponding instructions. In some embodiments and situations, such monitoring and corresponding automated responses may be performed by the Change Management system for modifications to one or more networking devices that are not performed by the Change Management system (e.g., that are manually performed by a user who specifies the configuration information to monitor such manual modifications).

After block 512, or if it was instead determined in block 510 that configuration information was not currently received, the routine continues to decision block 515 to determine whether the instructions or other information include a request to modify one or more networking devices, and if so the routine 500A continues to block 520; otherwise, the routine 500A continues to block 595. In block 595, the routine 500A performs one or more other indicated operation, if any, as appropriate. For example, in some embodiments, the routine may receive requests to manipulate provided computing resources of one or more computing nodes provided to the customer by the computing resource service, and if so may perform activities to satisfy such requests if they are authorized. Other types of operations performed with respect to block 595 may also include various administrative operations for the computing resource service, such as, for example, performing operations to register new users who can use the provided computing node(s).

If it is instead determined in decision block 515 that a modification request of the one or more networking devices is received in block 505, the routine 500A continues from decision block 515 to block 520. In block 520, routine 500A determines configuration information for the one or more networking devices for the requested modification. The request may identify one or more networking devices to perform one or more modifications to the settings of the one or more networking devices. The request may also include the configuration information for the one or more networking devices.

The configuration information identifies a variety of different information or commands associated with a change to a networking device. For example, the configuration information may identify one or more pre-modification commands and one or more post-modification commands to execute on the networking device and one or more networking operations to monitor and collect data in response to the execution of the commands. The configuration information may include one or more modifications to settings or other operating characteristics of the networking device. In some embodiments, the configuration information may also define the types of comparisons to perform between the collected information and one or more thresholds to identify and determine if a problem has occurred associated with the modification to the networking device. The configuration information also identifies one or more actions to perform in response to the comparing of networking operations information. For example, the configuration information may include a rollback command for removing the modification to the networking device if a problem is detected in the change of the networking device due to the performed modification. Other actions could include performing additional collection operations and compares of collected information (e.g., to determine if the problem is a reoccurring problem, or was an anomaly that was caused by some other network issue and not the modification to the networking device), performing additional modifications, etc.

In some embodiments, a type of each of the one or more networking devices is determined. Based on the type of networking device, the configuration information is selected from a plurality of different configuration information, where each of the plurality of different configuration information is configured for a corresponding type of networking device from a plurality of different types of networking devices. In at least one embodiment, the type of networking device may include a model and version of the networking device.

After block 520, the routine 500A continues with routine 500B in FIG. 5B at block 525. In block 525, the routine 500B executes a first collection operation on each of the one or more networking devices to collect information based on the determined configuration information. The routine 500B also collects—in response to the first collection operation—first information that describes one or more networking operations of the one or more networking devices. The networking operations information to collect may be defined by the configuration information specified by a user or by the configuration information. In some embodiments, the one or more networking devices may provide the networking operations to the routine 500A. In other embodiments, the routine 500A may monitor the networking operations of the networking devices.

After block 525, the routine 500B continues at block 530 to perform a first comparison of the snapshot information and the collected first information. In some embodiments, block 530 may be optional and not performed, such as if no snapshot is executed, no snapshot data is available, or based on the configuration information. In some embodiments, the comparison may be a direct comparison of the snapshot and the first information. In other embodiments, a hash or other translation table may be employed to convert the snapshot and first information into numerical form. Once in numerical form, these values are compared.

After block 530, the routine 500B continues at decision block 535 to determine if a problem is indicated by the first comparison. In some embodiments, if a result from the first comparison exceeds a threshold (e.g., a threshold value that is predetermined, provided by the user, defined by the configuration information, etc.) then there may be a problem with the networking device or the networking operations may have changed enough to render the modification determined with the configuration information in block 520 to be out-of-date or unsuitable.

If it is determined that a problem exists based on the comparison of the snapshot and the first information, the routine 500B continues at decision block 570 with routine 500A in FIG. 5A and prevents a modification from occurring on the networking device. But if there is no problem, the routine 500 continues at block 540 to perform the requested modification. In some embodiments, where a snapshot is not performed, decision block 535 may not be performed and the routine 500B would continue from block 530 to block 540.

In block 540, the requested modification is executed on the networking device. In various embodiments, the modification may be any of a variety of changes to the setting or other characteristics of the networking device. For example, the modification may be uploading a different version of software (e.g., an operating system or other software on the networking device), updating an interface, changing specific settings of the networking device (e.g., a number of links maintained by the networking device), etc.

After block 540, the routine 500B continues at block 545 to execute another collection operation on the one or more networking devices and collect additional network operations information in response to the additional collection operation. In various embodiments, this collection operation may be similar to what is described in conjunction with block 525. In some embodiments, this other collection operation may be an exact same operation that was executed in block 525. In other embodiments, the other collection operation may be different from the first collection operation executed in block 525. As described above, the configuration information determined in block 520 may indicate what additional collection operations or commands to execute on the network device.

After block 545, the routine 500B continues at block 550 to compare the additional collected information and the first collected information. In various embodiments, this comparison may be similar to what is described in conjunction with block 530. Additionally, the configuration information determined in block 520 may indicate the type of comparison to perform on the additionally collected information and the first collected information.

After block 550, the routine 500B continues to decision block 555 to determine if the comparison indicates a problem with the networking device, which may be similar to what is described in conjunction with decision block 535.

If it is determined that a problem exists based on the comparison of the first information and the additional information, the routine 500B continues with routine 500A at block 565; otherwise the routine 500B continues to decision block 560.

In decision block 560, the routine 500B determines whether or not to perform additional collection operations to collect additional network operations information. In some embodiments, the configuration information determined in block 520 may indicate how many collection operations to do if the comparison indicates there is no problem. For example, the routine 500B may continue to loop until a predetermine time has passed since the modification was performed, a number of collection operations have been performed without a problem (e.g., one collection operation without a problem, three collection operations, or the like), an instructions is received from the user to stop collecting, a status or state of the networking device changes (e.g., the available computing resources of the networking device exceed some threshold level such that computing resources should not be utilized to perform operations to collect networking operation information), etc.

If another collection operation is to be performed, the routine 500B loops to block 545; otherwise, the routine 500B continues at decision block 570 in routine 500A in FIG. 5A.

If it is determined that there is a problem with the network operations of the networking device in decision block 555, the routine 500A continues at block 565. In block 565 an action is performed on the networking device based on the problem. In some embodiments, the configuration information determined at block 520 may define what actions are to be performed upon a problem with the networking device. In at least one embodiment, the action may be a rollback instruction that is executed on the networking device, which removes the modification performed in block 540 from the networking device. In another embodiment, the action may be a further modification to the settings or networking characteristics of the networking device. Embodiments are not so limited and other actions may be performed, such as, but not limited to, sending a notification to the user of the problem, setting a future collection operation to be performed, etc.

After blocks 565 or 595, or if it is determined in decision block 535 that there is a problem between the snapshot and the first information, or if it determined in decision block 560 to perform no additional collection operations, the routine 500A continues at decision block 570. In decision block 570, the routine 500A determines whether to continue the routine and process additional information, such as until an explicit indication to terminate is received. If it is determined to continue, routine 500 returns to block 505, otherwise, the routine 500A ends.

It should be noted that the number of collection operations and comparisons that are performed before, during, or after a modification may vary from what is illustrated in the figures. Similarly, various other compares of collected network operations information may be performed. For example, in some embodiments, results from one comparison may be compared to results from another comparison, which may indicate a problem if the additional comparison exceeds another threshold. In one non-limiting example, a result of the comparison in block 530 and a result of the comparison in block 550 may not indicate a problem, but a comparison of those results exceeding a threshold may indicate that there is a problem with the changes caused by the modification to the networking device. As a result, the modification may be rolled back or another action may be performed as described in block 565.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art should appreciate that in other embodiments the operations may be performed in other orders and in other manners. Those skilled in the art should also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it should be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
    receiving, by a computing system, configuration information from a user for use in managing changes to a networking device that is performing networking operations in a computer network, wherein the changes result from a modification made to settings of the networking device;
    executing, by the computing system and based on the received configuration information, a command on the networking device to collect first information that describes the networking operations performed by the networking device, the executing the command including providing information from the computing system to the networking device to cause execution by the networking device of one or more first specified instructions to collect the first information;
    performing the modification to the settings of the networking device to alter the networking operations of the networking device;
    executing, by the computing system and upon completion of the performing of the modification, an additional command on the networking device to collect second information that describes the altered networking operations of the networking device, the executing the additional command including providing additional information from the computing system to the networking device to cause execution by the networking device of one or more second specified instructions to collect the second information;
    comparing, by the computing system, the collected first and second information to determine the changes and to identify a problem with the altered networking operations of the networking device based on the determined changes; and
    executing, by the computing system and in response to the identified problem, a rollback instruction on the networking device to remove the modification to the settings.

2. The computer-implemented method of claim 1 further comprising, before the executing of the command:
    determining, by the computing system, a type of the networking device from a plurality of different types of networking devices; and
    selecting, by the computing system and based on the determined type of the networking device, the command to execute from a plurality of commands for collecting information about networking operations, wherein each of the plurality of commands is configured for use with a corresponding type of networking device of the plurality of different types of networking devices.

3. The computer-implemented method of claim 2 wherein the determining of the type of the networking device includes determining a model and version of the networking device.

4. The computer-implemented method of claim 1 wherein the networking device is at least one of a router, a switch, a bridge, a gateway, a hub, a firewall or a load balancer.

5. The computer-implemented method of claim 1 further comprising, before the performing of the modification:
    obtaining, by the computing system, a snapshot of the networking operations;
    comparing, by the computing system, the snapshot and the first information to identify an existing problem with the networking device; and
    preventing, by the computing system and in response to the identified existing problem, the performing of the modification while the identified existing problem persists.

6. The computer-implemented method of claim 5 further comprising:
    initiating, by the computing system and after the identified existing problem no longer persists, the performing of the modification; and
    comparing, by the computing system, the snapshot and the collected first and second information to identify a further problem, and wherein the executing of the rollback instruction is performed based on the identified further problem.

7. The computer-implemented method of claim 1 wherein the configuration information includes information about the modification, and wherein the computing system performs the modification based on the configuration information.

8. The computer-implemented method of claim 1 wherein the configuration information includes information about a type of automated response for a corresponding type of problem, and wherein the executing of the rollback instruction in response to the identified problem includes determining, by the computing system and based on the configuration information, to perform the rollback instruction as an automated response to the identified problem.

9. The computer-implemented method of claim 1 wherein the computing system is part of a change management system that has a plurality of clients, wherein the user is one of the plurality of clients of the change management system, wherein the one or more first specified instructions and the one or more second specified instructions are same instructions, and wherein the computing system stores the collected first information for the user for use in later comparing the collected first information and the collected second information to determine the changes.

10. A non-transitory computer-readable medium having stored contents that cause a computing system to at least:
provide, from the computing system to a networking device, first information to cause execution by the networking device of a command to collect first information that describes networking operations performed by the networking device in a computer network;
modify a configuration of the networking device that alters the networking operations of the networking device;
provide, from the computing system to the networking device upon completion of modifying the configuration of the networking device, second information to cause execution by the networking device of an additional command to collect second information that describes the altered networking operations of the networking device;
analyze, by the computing system, changes between the collected first and second information, the analyzing identifying a problem based on the changes; and
execute, by the computing system and in response to the identified problem, a rollback instruction on the networking device to remove the modified configuration.

11. The non-transitory computer-readable medium of claim 10 wherein the stored contents further cause the computing system to, before the execution of the command:
determine, by the computing system, a type of the networking device from a plurality of different types of networking devices having a plurality of types of commands for collecting information about networking operations; and
select, by the computing system and based on the determined type of the networking device, the command to execute from the plurality of types of commands.

12. The non-transitory computer-readable medium of claim 10 wherein the stored contents further cause the computing system to:
before the modifying of the configuration of the networking device, obtain, by the computing system, a snapshot of the networking operations;
identify, by the computing system, additional changes between the snapshot and the first information, the additional changes identifying an existing problem; and
prevent, by the computing system and in response to the existing problem, the modifying of the configuration of the networking device.

13. The non-transitory computer-readable medium of claim 12 wherein the stored contents further cause the computing system to:
initiate, by the computing system and after the identified existing problem no longer persists, the modifying of the configuration, wherein the modifying of the configuration includes changing a setting of the networking device that affects the networking operations;
identify, by the computing system, further changes between the snapshot and the second information; and
execute, by the computing system, the rollback instruction on the networking device to remove the modified configuration based on the analyzing having identified the problem based on the changes and on the identified further changes.

14. The non-transitory computer-readable medium of claim 12 wherein the stored contents further cause the computing system to:
compare, by the computing system, the changes between the collected first and second information and the additional changes between the snapshot and the first information; and
execute, by the computing system and based on the comparing, the rollback instruction on the networking device to return an operating state of the networking device to a time before the modifying of the configuration.

15. The non-transitory computer-readable medium of claim 12 wherein the networking device is a virtual device that is implemented using one or more computer systems configured to emulate functionality of the networking device.

16. The non-transitory computer-readable medium of claim 10 wherein the stored contents further cause the computing system to:
modify an additional configuration of the networking device that further alters the networking operations of the networking device;
execute, by the computing system, a further command on the networking device to collect third information that describes the further altered networking operations of the networking device;
identify, by the computing system and based on the third information, a resulting problem from the modifying of the additional configuration; and
execute, by the computing system and based on the resulting problem, an automated response to the resulting problem that addresses the resulting problem without performing a rollback on the networking device.

17. The non-transitory computer-readable medium of claim 10 wherein the networking device is one of multiple networking devices of a single type that are each performing respective networking operations in the computer network, wherein the providing of the first information to cause the execution of the command and the modifying of the configuration and the providing of the second information to cause the execution of the additional command are performed for each of the multiple networking devices in parallel, and wherein the rollback instruction is executed on one of the multiple networking devices based on a problem that is identified for the one networking device, and wherein the rollback instruction is not executed on another of the multiple networking devices based on no problems being identified for the another networking device.

18. The non-transitory computer-readable medium of claim 10 wherein the networking device is one of multiple networking devices of multiple types that are each performing respective networking operations in a common subset of the computer network, wherein the providing of the first information to cause the execution of the command and the modifying of the configuration and the providing of the second information to cause the execution of the additional command are performed for each of the multiple networking devices, and wherein the command and the additional command executed by one of the multiple networking devices is of a different type than the command and the additional command executed by another of the multiple networking devices based on the one networking device and the another networking device being of different types.

19. A system, comprising:
a processor of a computing system; and
a memory having stored instructions that, when executed by the processor, cause the processor to:
  modify a configuration of a networking device that alters networking operations of the networking device in a computer network;
  providing information from the computing system to the networking device to cause the networking device to execute multiple instructions on the networking device at multiple times to collect respective responses to the multiple instructions that include information describing the networking operations of the networking device at the multiple times, wherein one or more of the multiple times is after completion of the modifying of the configuration;
  analyze changes between information included in the collected respective responses and identify a problem based on the changes; and
  initiate, as a result of the identifying of the problem based on the changes, performance of another modification to the configuration of the networking device.

20. The system of claim 19 wherein the another modification to the configuration of the networking device is performed by the processor and includes rolling back the modifying of the configuration to remove the modified configuration from the networking device.

21. The system of claim 19 wherein the initiating of the performance of the another modification includes sending an electronic communication to a recipient associated with the networking device to cause the recipient to perform the another modification.

* * * * *